United States Patent [19]
Nakajima et al.

[11] Patent Number: 5,556,138
[45] Date of Patent: Sep. 17, 1996

[54] PIPE CONNECTING DEVICE

[75] Inventors: Hiroshi Nakajima, Chiryu; Toshio Tsuboko, Anjo, both of Japan

[73] Assignee: Nippondenso Co., Ltd., Kariya, Japan

[21] Appl. No.: 411,566

[22] Filed: Mar. 28, 1995

[30] Foreign Application Priority Data

Mar. 28, 1994 [JP] Japan .................................. 6-057312

[51] Int. Cl.⁶ ........................... F16L 35/00; F16L 23/02; F16L 3/22
[52] U.S. Cl. ...................... 285/137.1; 285/415; 285/420
[58] Field of Search ................................ 285/137.1, 415, 285/420, 405; 137/595, 596; 62/292, 298, 299

[56] References Cited

U.S. PATENT DOCUMENTS

| 3,842,389 | 10/1974 | Glover | 285/137.1 |
|---|---|---|---|
| 4,468,054 | 8/1984 | Orth | 285/137.1 |
| 4,611,831 | 9/1986 | Truchet | 285/137.1 |
| 5,071,169 | 12/1991 | Moschet | 285/137.1 |
| 5,129,420 | 7/1992 | Johnson | 137/595 |
| 5,294,156 | 3/1994 | Kumazaki et al. | 285/137.1 |
| 5,323,808 | 6/1994 | Shimizu | 285/137.1 |
| 5,467,611 | 11/1995 | Cummings et al. | 285/137.1 |

FOREIGN PATENT DOCUMENTS

| 647959 | 9/1962 | Canada | 285/137.1 |
|---|---|---|---|
| 59-9928 | 3/1984 | Japan . | |
| 62-5364 | 2/1987 | Japan . | |
| 2-37030 | 10/1990 | Japan . | |
| 2-37036 | 10/1990 | Japan . | |
| 3-49354 | 10/1991 | Japan . | |
| 4-18890 | 4/1992 | Japan . | |
| 4266521 | 9/1992 | Japan . | |
| 2245946 | 1/1992 | United Kingdom | 285/137.1 |

Primary Examiner—Eric K. Nicholson
Attorney, Agent, or Firm—Cushman, Darby & Cushman

[57] ABSTRACT

Connection of two dividing flanges by joining of protrusion and depression, protrusion and depression, and protrusion and notch, in addition to tightening and joining by means of self-tapping screw to create the connecting flange. At this time, the hexagonal nut is located beforehand in the insertion hole created on dividing flange, and the hexagonal bolt passed from the connecting flange on the side for connection is screwed to the hexagonal nut.

20 Claims, 7 Drawing Sheets

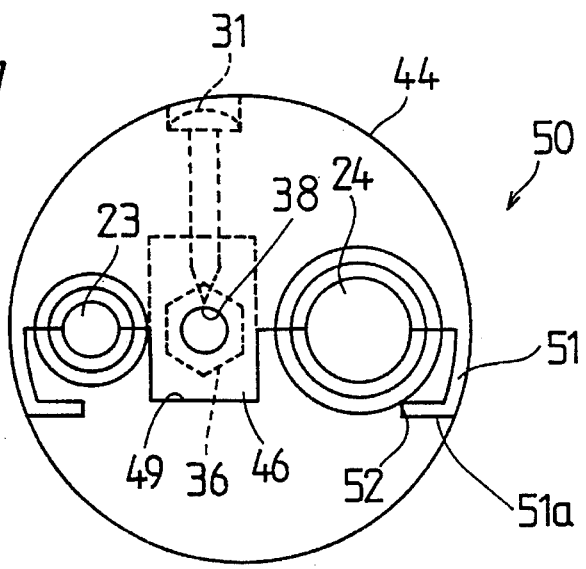
FIG. 9
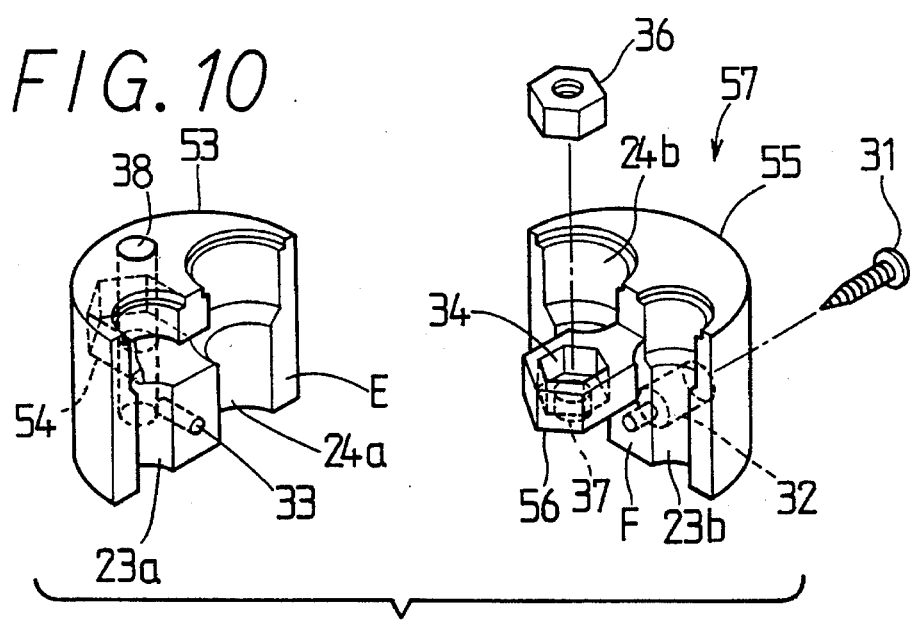
FIG. 10
FIG. 11
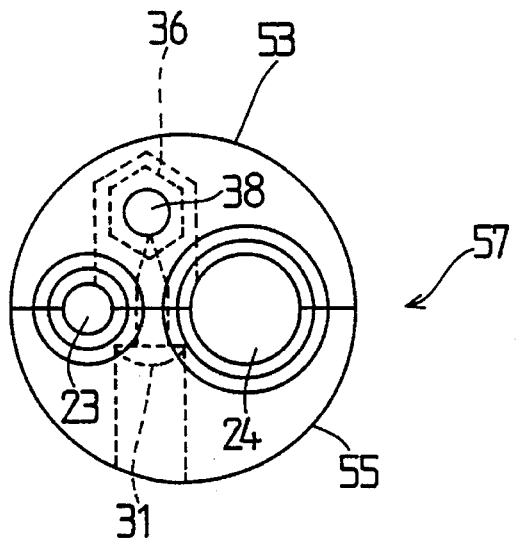

PIPE CONNECTING DEVICE

CROSS REFERENCE OF RELATED APPLICATION

This application is based upon and claims priority from Japanese Patent Application No. Hei 6-57313 filed Mar. 28, 1994, the contents of which are incorporated herein by reference.

BACKGROUND OF THE INVENTION

1. Field of the Invention

This invention relates to a pipe connecting device to connect mutual ends of pipes and thus create a flow of liquids for refrigeration cycle in an automotive air conditioning device.

2. Description of the Related Art

Among devices for connecting refrigerant pipe for refrigeration cycle in automotive air conditioners, there is, for example, Japanese Patent Application Laid-Open No. Hei 4-266521. That invention has a structure in which connecting flanges are attached to the male and female side refrigerant pipe, and the connecting flanges are connected to thus connect the refrigerant pipe on the male side and the refrigerant pipe on the female side. FIG. 14 and FIG. 15 show the structure of the connecting flanges.

FIG. 14 and FIG. 15 show a connecting flange 3 of the refrigerant pipes 1 and 2 on the male side. This connecting flange 3 is composed of two dividing flanges 4 and 5. The dividing surfaces of dividing flanges 4 and 5 include the concave grooves 4a, 4b and 5a, 5b. Dividing flange 4 includes hook-shaped retainers 4c and 4c on both sides. Dividing flanges 4 and 5 are made of resin mold and include the nuts 6 and 7 which are inserted at the time of molding.

As FIG. 15 shows, in order to attach the connecting flange 3 (i.e. the dividing flanges 4 and 5) to the refrigerant pipes 1 and 2, the dividing flanges 4 and 5 are slid with the concave grooves 4a, 4b and 5a, 5b fit into the refrigerant pipes 1 and 2, thus fitting both ends of dividing flange 5 into the retainers 4c, 4c of dividing flange 4. A small screw 8 passed through dividing flange 5 is screwed to dividing flange 4. Thus, as shown in FIG. 14, the connecting flange 3 is attached to refrigerant pipes 1 and 2.

The connecting flange of the refrigerant pipe on the female side has the same structure as the connecting flange 3, although it differs in not including the nuts 6 and 7. Instead there is a hole for insertion of a bolt.

In order to connect the refrigerant pipe on the male and female sides with such connecting flanges, the ends of the refrigerant pipes 1 and 2 on the male side are inserted in the female pipe, after which the connecting flange 3 on the male side and the connecting flange on the female side are joined together. Then the bolts passed through the holes on the two dividing flanges on the female side are screwed to the nuts 6 and 7 of the dividing flanges 4 and 5 of the refrigerant pipes 1 and 2 on the male side in order to connect the connecting flange 3 on the male side and the connecting flange on the female side. As a result, the refrigerant pipe on the female side is connected with the refrigerant pipes 1 and 2 on the male side.

However, the existing pipe connecting device described above has a structure in which the connecting flange 3 on the male side and the connecting flange not shown in the figure on the female side are connected by screwing two bolts to the two nuts 6 and 7. The result is a large number of parts, thus reducing the efficiency of connection operations. Also, because the nuts 6 and 7 are formed together with the dividing flanges 4 and 5 by an insert mold, the molding costs for the dividing flanges 4 and 5 are high.

SUMMARY OF THE INVENTION

The object of the present invention is to provide a more inexpensive pipe connecting device without an insert molding. The other object of the present invention is to provide a pipe connecting device in which it is possible by means of a single connecting means to connect the connecting flange to the side for connection. Moreover, when the connecting means is a single connecting screw, it is not absolutely necessary to use an insert mold structure in which the nut for screwing the connecting screw is molded together with the dividing flange.

To achieve the above objects, the present invention adopts a pipe connecting device including a first pipe and second pipe that a fluid flows therein and have engaged portions respectively protruding at respective outer periphery of their one ends thereof in a direction approximately perpendicular to a direction which the fluid flows in, a third pipe and fourth pipe connected to the one end of said first and second pipes, a fix plate having an engaging portion which engages simultaneously with the engaged portions of the first and second pipe, a connecting flange having a plurality of dividing flanges, the plurality of dividing flanges holding the third and fourth pipes on divided surfaces thereof, a screw means for tightening the fix plate and the connecting flange, a nut means for receiving the screw means, a holding portion forming from an insert hole which has a whirl-stop shape for one of the screw means and nut means at one of the divided surfaces of one of the plurality of dividing flanges, and a receiving portion engaging with the holding portion to cover the insert hole at the other one of the divided surfaces of one of the plurality of dividing flanges.

By adopting the present invention, nut are not required to be inserted to dividing flanges during molding.

BRIEF DESCRIPTION OF THE DRAWINGS

FIG. 9 is a top view showing combined dividing flanges;

FIG. 10 is a perspective view of dividing flanges showing embodiment 3 of the invention;

FIG. 11 is a top view of combined dividing flanges;

DETAILED DESCRIPTION OF THE PRESENTLY PREFERRED EXEMPLARY EMBODIMENTS

Next follows a concrete description of the invention by means of embodiments. Moreover, the following embodiment is suited to a case of connecting the refrigerant pipe of a refrigeration cycle for automotive air conditioning device.

Figure 7:
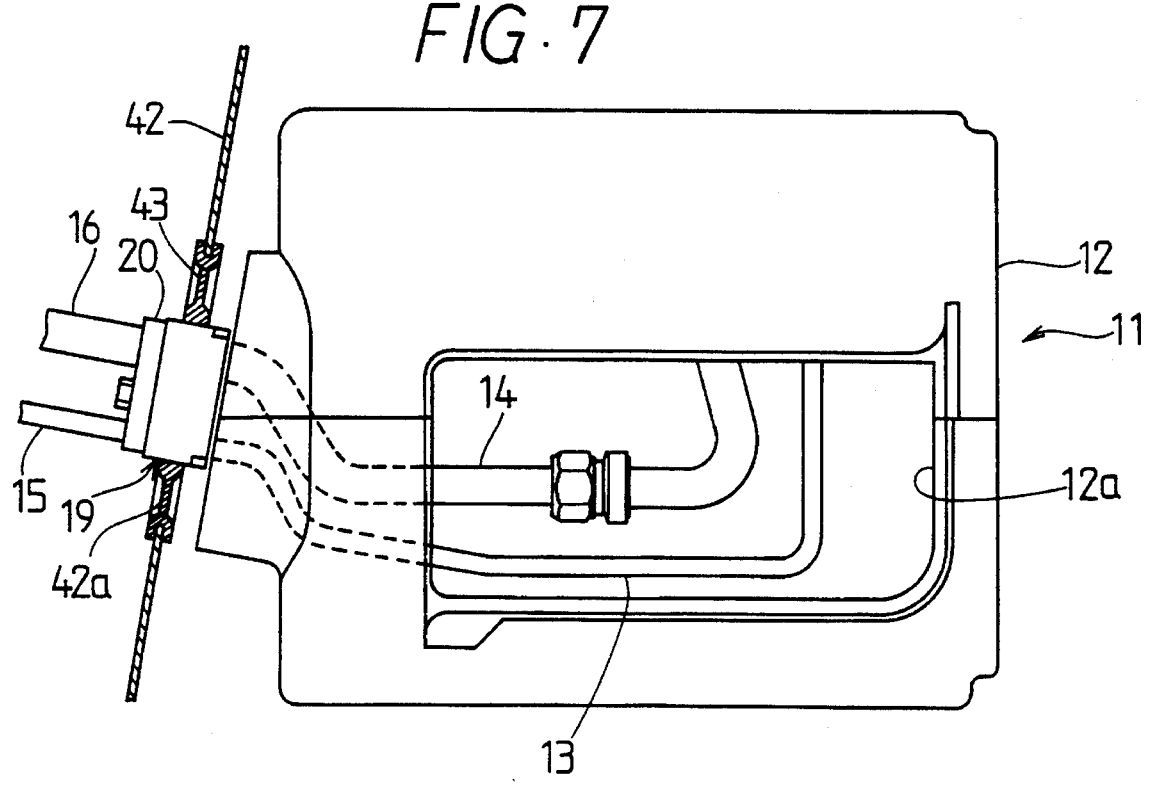
FIG. 7 is a partially cross-sectional view of the pipe section of the auto cooler unit.

First, FIGS. 1 to 7 show embodiment 1 of this invention. FIG. 7 shows the cooler unit comprising one section of the automotive air conditioning device. Included inside a case 12 of the cooler unit 11 is an evaporator (not shown in figure) for refrigeration cycle.

The evaporator is composed of a refrigerant pipe 13 for receiving refrigerant supplied by a condenser, and refrigerant pipe 14 for returning the evaporated refrigerant steam to a compressor. Furthermore, one side of case 12 includes an intake hole 12a for intake of air sent from a blower not shown in the figure. The refrigerant pipe 13 and 14 are created for connection to a refrigerant pipe 15 and 16 extending from the condenser and compressor in the engine room after the cooler unit 11 is located in the interior of the vehicle. The refrigerant pipe 13 to 16 is all made of aluminum.

Figure 6A:
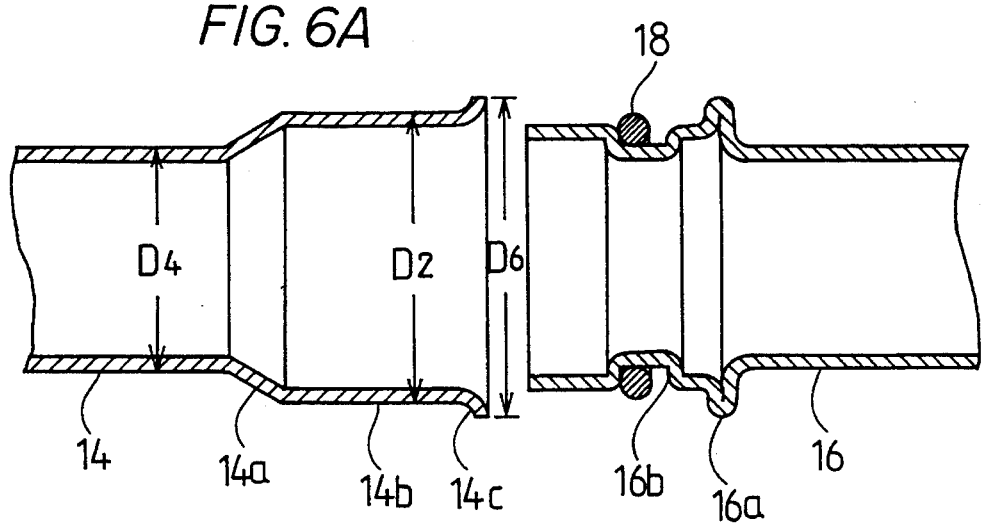
FIG. 6 is a vertical cross-sectional view of the male-side refrigerant pipe and the female side refrigerant pipe.
Figure 6B:
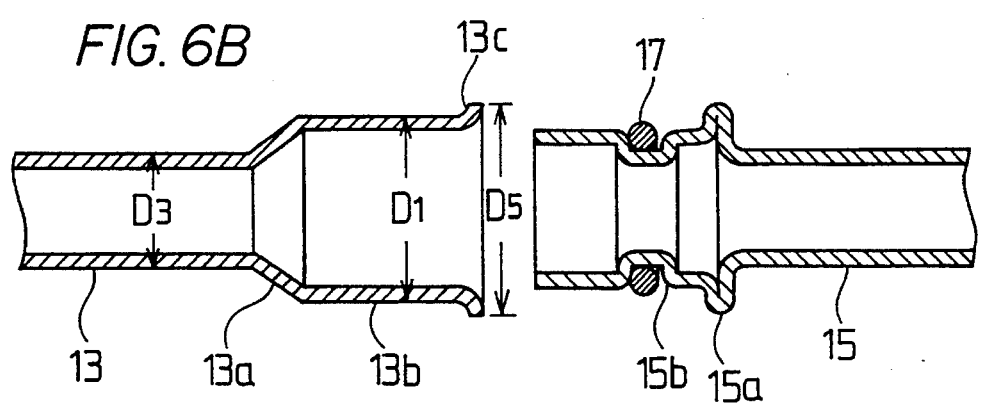

As FIG. 6 shows, the ends of the refrigerant pipe 13 and 14 of the evaporator have enlarged diameter portions 13b and 14b. Enlarged diameter portions 13b and 14b are connected to pipes 13 and 14 by tapered portions 13a and 14a. Furthermore, the flared edges 13c and 14c of enlarged diameter portions 13b and 14b are flared to have more enlarged diameters. Meanwhile, as FIG. 6 shows, ends of the refrigerant pipes 15 and 16 connected to the condenser and the compressor have hilt-shaped bulge portions 15a and 16a (These are defined as an engaged portions in claims) and circular grooves 15b and 16b for insertion of the O-rings 17 and 18 beyond the bulges 15a and 16a. The refrigerant pipe 16 is connected to the pipe 14 by inserting the edge of the refrigerant pipe 16 into the inside of the enlarged diameter portion 14b. The refrigerant pipe 15 is connected to the pipe 13 by inserting the edge of the refrigerant pipe 15 into the inside of the enlarged diameter portion 13b. As a result, the refrigerant pipe 13 and 14 are the female side pipe and the refrigerant pipe 15 and 16 are the male side pipe.

In order to connect the refrigerant pipe 13 to 16 as described above, a connecting flange 19 as shown in FIG. 2 is attached to the refrigerant pipe 13 and 14, and a plate-shaped connecting flange 20 ( this is defined as a fix plate in claims) is attached to refrigerant pipe 15 and 16.

The connecting flange 19 of refrigerant pipe 13 and 14 on the female side is composed of more than one flange, for example, two dividing flanges 21 and 22 which are divided in the direction of diameter. The dividing flanges 21 and 22 are made of non-conductive resin mold. Among resins, nylon, polypropylene, polyoxymethylene, epoxy, polyester etc. are superior in terms of strength, with nylon showing especially good qualities. In the following description, of the two ends of the dividing flanges 21 and 22 in an axial direction, the surface of the connecting flange 20 of the refrigerant pipe 15 and 16 on the male side which is the side for connection will be defined as the contacting face and the opposite surface will be defined as the non-contacting face.

Figure 1:
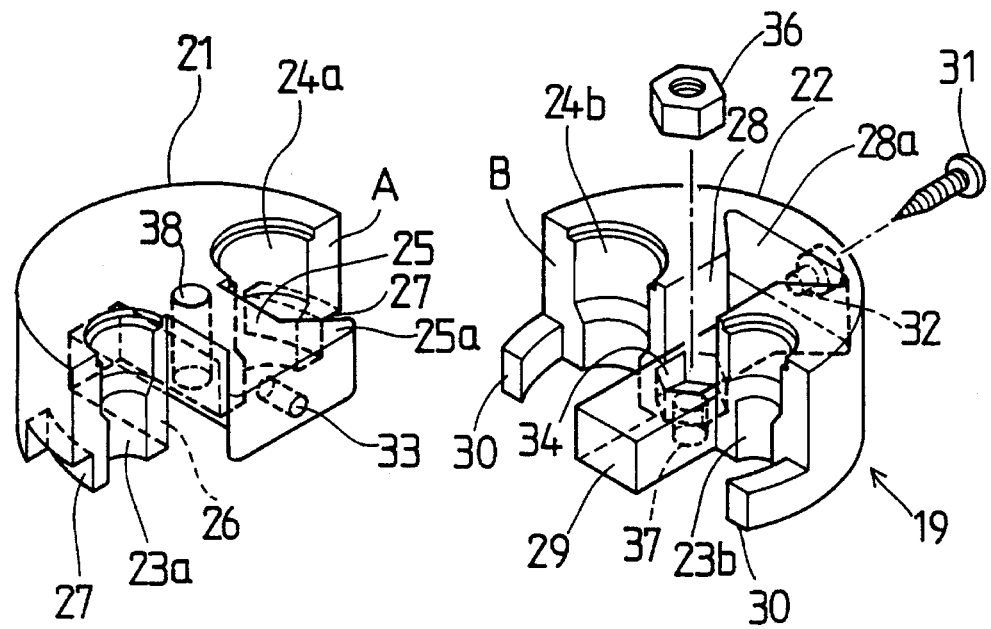
FIG. 1 is a perspective view of dividing flanges showing a first embodiment of this invention.
Figure 2:
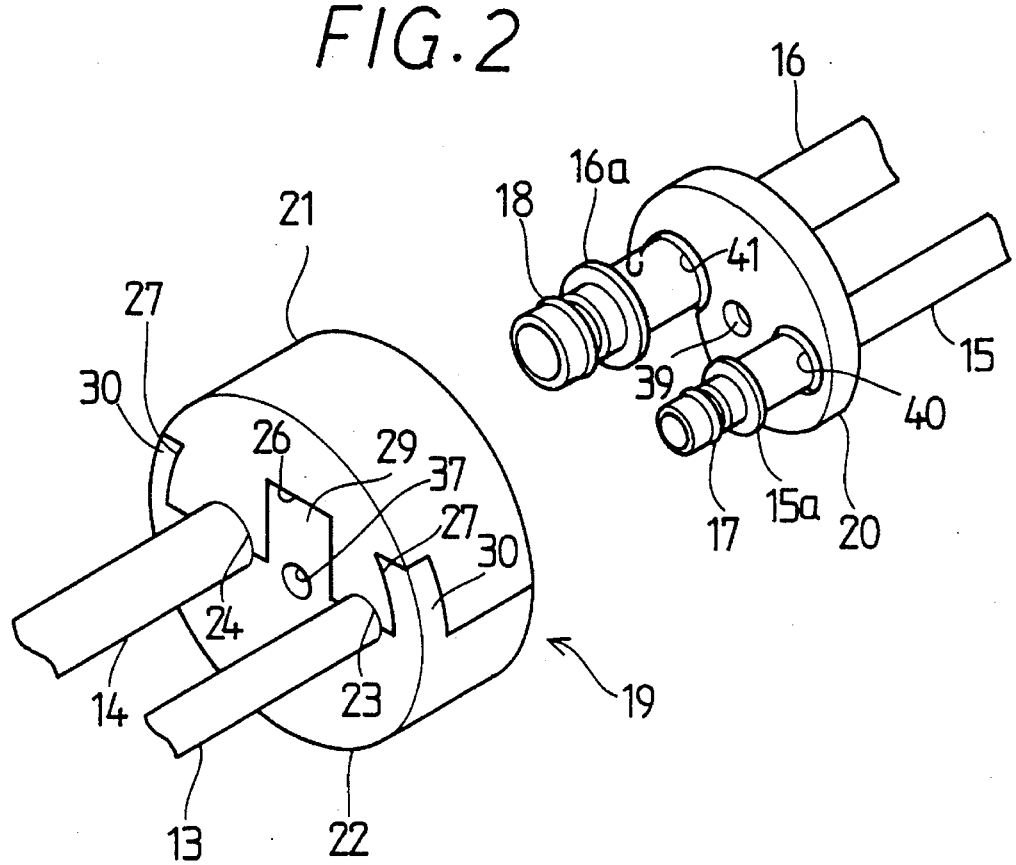
FIG. 2 is an exploded view of the dividing flanges.
Figure 5:
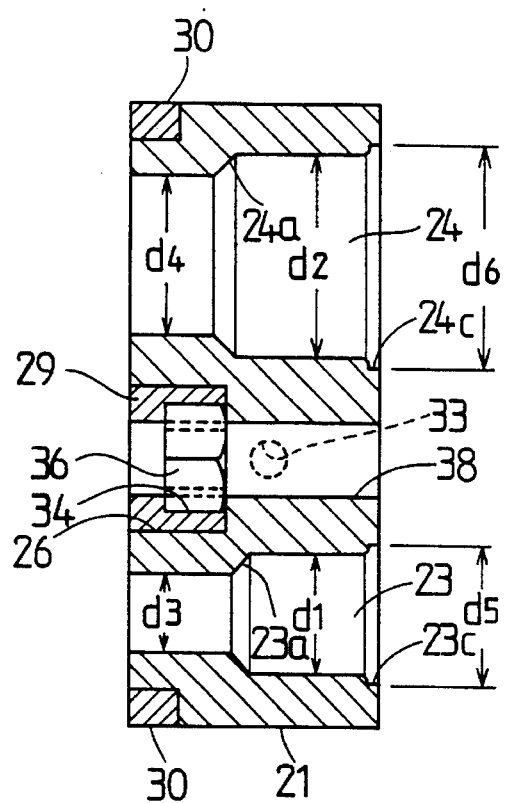
FIG. 5 is a vertical cross-sectional view of the dividing flange 21.

As FIG. 1 shows, the dividing surfaces A and B of the dividing flanges 21 and 22 include the semicircular concave grooves 23a, 24a and 23b, 24b. As a result, when the two dividing flanges 21 and 22 are integrated together on their dividing surfaces A and B, they form the circular fitting holes 23 and 24 having stepped portions as shown in FIG. 5. The fitting holes 23 and 24 respectively fit together the ends with enlarged diameter portion 13b and 14b of the refrigerant pipe 13 and 14 as well as their bases. The internal diameter d1 and d2 (contacting face side) is created so that it is slightly larger than the external diameter D1 and D2 of enlarged diameter portion 13b and 14b. The internal diameter d3 and d4 (non-contacting face side) is created so that it is slightly larger than the external diameter D3 and D4 of enlarged diameter portion 13b and 14b. The tapered portion 23a and 24a are corresponding to the tapered portion 13a and 14a of the refrigerant pipe 13 and 14. In addition, the edges of enlarged diameter of the fitting holes 23 and 24 have larger diameter, so that the internal diameter d5 and d6 of largest diameter portion 23c and 24c is slightly larger than the external diameter D5 and D6 of the flared edges 13c and 14c of the refrigerant pipe 13 and 14.

The dividing flanges 21 and 22 include protrusions and depressions described below, thus creating stepped portion engaging with each other.

As shown in FIG. 1, a projection portion 25 (this is defined as a receiving portion in claims) having a triangular broadening portion 25a is disposed at an edge in the center of the dividing surface A. Also, a rectangular depression 26 is formed on the center of the non-contacting face of the dividing flange 21. Notches 27 are disposed on the outer edges on both sides of the dividing flange 21. In contrast, a depression 28 having a triangular broadening portion 28a is disposed in the center of the contacting face of the other dividing flange 22. The protrusion 25 is fitted into the depression 28. Also, a rectangular protrusion 29 (this is defined as a holding portion in claims) which fits into the depression 26 is disposed in the center of the dividing surface B of the other dividing flange 22. And arc-shaped protrusions 30 which fit into the notches 27 is disposed on both sides of the dividing flange 22.

The dividing flanges 21 and 22 are connected by joining of the protrusion 25 with the depression 28 and joining of the protrusions 29 and 30 with the depression 26 and notches 27. In addition, they are joined by a connecting screw acting as a joining means, such as the self-tapping screw 31. In other words, included in dividing flange 22 is a stepped through-hole 32 passing from the peripheral surface opposite to the dividing surface B to the broadening portion 28a of the depression 28. The through-hole 32 is disposed to allow insertion of the self-tapping screw 31. Included on the broadening portion 25a of the protrusion 25 of the dividing flange 21 is a prepared hole 33 for screwing a self-tapping screw 31.

Included on the section on the other dividing flange 22 extending from the protrusion 29 to the bottom of the depression 28 is a hexagonal insertion hole 34. The insertion hole 34 is for insertion of a single connecting screw (such as a hexagonal nut 36 screwed to a hexagonal bolt 34) as one means of connecting the connecting flange 19 to the connecting flange 20 on the male side. Included in the bottom center of the insertion hole 34 is an escape hole 37 to allow escape of the end of the hexagonal bolt 35 (see FIG. 3 and FIG. 4) protruding from the hexagonal nut 36. Also, included on the dividing flange 21 on the section corresponding to the center of the insertion hole 34 is a through-hole 38.

The connecting flange 20 on the male side can be made of metal or a resin material to prevent electric corrosion of the refrigerant pipe 15 and 16, and includes in the center a through-hole 39 for passage of the hexagonal bolt 35. Also included on both sides of the through-hole 39 are a circular hole 40 for passage of the refrigerant pipe 15 and a connection groove 41 for connection to the refrigerant pipe 16. By inserting the refrigerant pipe 15 in the circular hole 40, it is possible to attach the connecting flange 20 to the refrigerant pipe 15 so that it is capable of rotating. The circular hole 40 and the connection groove 41 have stepped portion (this is defined as an engaging portion in claims) to receive the bulges portion 15a and 16a of the refrigerant pipe 15 and 16.

Next follows a description of a case where refrigerant pipe 13 and 14 is connected to refrigerant pipe 15 and 16 with the structure described above. In order to attach the female side dividing flanges 21 and 22 to the refrigerant pipe 13 and 14, the hexagonal nut 36 is first inserted in the insertion hole 34 on the dividing flange 22 and, with both dividing flanges 21 and 22 slid in an axial direction, the grooves 23a, 24a and 23b, 24b are fitted into the refrigerant pipe 13 and 14. By sliding the dividing flanges 21 and 22, there is fitting of protrusion 25 together with depression 28, depression 26 together with protrusion 29 and the notches 27 together with the protrusions 30. By means of this fitting, the insertion hole 34 of the hexagonal nut 36 formed in the other dividing flange 22 is covered by the protrusion 25 of the dividing flange 21, as shown in FIG. 5. As a result, the hexagonal nut 36 is sandwiched between the protrusion 25 and the protrusion 29 in an axial direction and thus retained so that it cannot fall inadvertently from the insertion hole 34.

In particular, due to the fitting of the broadening portion 25a of the protrusion 25 and the broadening portion 28a of the depression 28, and due to the fitting of the arc-shaped notches 27 and the protrusions 30, the two dividing flanges 21 and 22 are temporarily joined in a radial direction so they cannot separate, thus composing the connecting flange 19. As a result, the protrusion 25 and the depression 28, the notches 27 and the protrusions 30 function as a temporary joining means to prevent separation of the two dividing flanges 21 and 22 until screwing on of the self-tapping screw 31.

Next, the connecting flange 19 is shifted to the end side of the two refrigerant pipe 13 and 14 until the ends with enlarged diameter portions 13b and 14b of the refrigerant pipe 13 and 14 are completely inserted in the joining holes 23 and 24. In this state, the self-tapping screw 31 is inserted in the through-hole 32 and the self-tapping screw 31 is screwed in the prepared hole 33. By screwing on of the self-tapping screw 31 there is joining of the dividing surfaces A and B of the two dividing flanges 21 and 22. Also, the ends with enlarged diameter portion 13b and 14b of the refrigerant pipe 13 and 14 inside the fitting holes 23 and 24 are screwed on so that there is securing of the refrigerant pipe 13 and 14 and the connecting flange 19.

With the connecting flange 19 attached to the refrigerant pipe 13 and 14, the ends of the refrigerant pipe 15 and 16 on the male side are inserted in the refrigerant pipe 13 and 14, and the connecting flange 20 is caused to rotate with refrigerant pipe 15 at the center, while refrigerant pipe 16 is fitted to the connection groove 41. At this time, the connecting flange 20 is slid and brought into contact with the contacting face of connecting flange 19 on the female side. Then the hexagonal bolt 35 is inserted via the through-hole 39 on the connecting flange 20. The hexagonal bolt 35 is passed through the through-hole 38 on dividing flange 21 and screwed to the hexagonal nut 36. As a result, the dividing flange 21 is screwed and secured to connecting flange 19 by means of hexagonal bolt 35.

Figure 3:
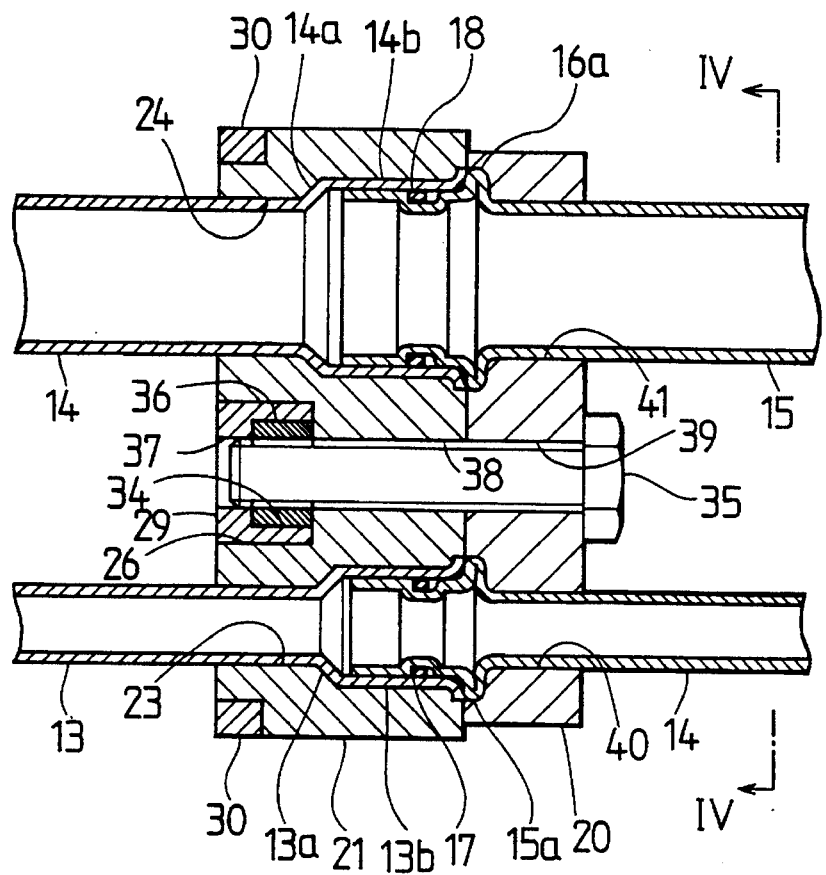
FIG. 3 is a vertical cross-sectional view showing the connection state.
Figure 4:
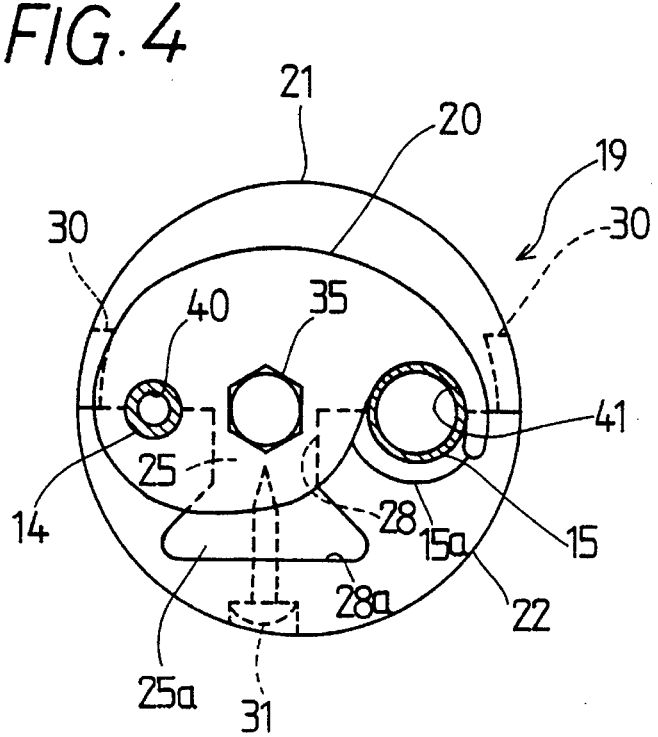
FIG. 4 is a cross-sectional view along line IV—IV in FIG. 3.

At this time, because dividing flange 22 is joined to dividing flange 21 by means of self-tapping screw 31, the tightening force of hexagonal bolt 35 also extends to the dividing flange 22 so that connecting flange 19 and connecting flange 20 are joined by a single hexagonal nut 35. As FIG. 3 shows, due to the joining of connecting flanges 19 and 20, the refrigerant pipe 15 and 16 and refrigerant pipe 13 and 14 are secured in a connection state in which there is hermetical sealing by means of O-rings 17 and 18. Also, because hexagonal nut 36 is fitted in the hexagonal insertion hole 34, there is no turning together with hexagonal bolt 35 when the hexagonal bolt 35 is screwed in.

Also, as shown in FIG. 7, connecting flange 19 exists inside an opening 42a created in the dashboard lower panel 42 separating the auto interior and the engine room. The crack from the space created by the opening 42a is sealed off hermetically by means of a grommet 43 that is installed at the opening 42a.

According to this embodiment, it is possible with the single hexagonal bolt 35 to join the connecting flanges 19 and 20, thus requiring only the single hexagonal nut 35 and thereby reducing the number of parts required to join the connecting flanges 19 and 20 while improving operational efficiency in joining.

Moreover, because hexagonal nut 36 is retained in insertion hole 34, it is not necessary to insert hexagonal nut 36 when molding dividing flange 21 or 22, thereby reducing molding costs.

Additionally, the dividing surface A of dividing flange 21 is formed in gradations in the direction of greater thickness due to the protrusion 25, the depression 26 and the notches 27. The dividing surface B of dividing flange 22 is also formed in stepped portions in the direction of greater thickness due to the depression 28 and the protrusions 29 and 30. As a result, when joining the dividing flanges 21 and 22, the dividing surfaces A and B create a maze form, thus preventing air from passing between the auto interior and engine room via the space between dividing surfaces A and B.

Also, because dividing flanges 21 and 22 are made of non-conductive resin mold, there is no danger of the aluminum refrigerant pipe 13 and 14 undergoing electric corrosion as is the case with metal flanges. Likewise, because the structure is composed of the protrusion 25, the depression 26, the notches 27 and the depression 28, the protrusions 29 and 30 as mentioned above, even if dividing flanges 21 and 22 have a complex shape, it is easy to manufacture them with die moldings.

Moreover, the refrigerant pipe 13 and 14 to which the dividing flanges 21 and 22 are attached is a female side. Thus, when joining the dividing flanges 21 and 22, it is possible in terms of the basic structure to prevent biting of the O-rings 17 and 18 attached to the periphery of the male-side refrigerant pipe 15 and 16. Also, because of the concave grooves 23a, 23b and 24a, 24b formed in the dividing surfaces A and B of dividing flanges 21 and 22, there is creation of the fitting holes 23 and 24 for fitting of the ends with enlarged diameter 13b and 14b of the refrigerant pipe 13 and 14. Thus, it is possible together with joining of the dividing flanges 21 and 22 to also attach them to the refrigerant pipe 13 and 14, thus improving operational efficiency. Moreover, the fitting holes 23 and 24 are stepped, so that due to the tapered grades 23b and 24b it is possible to receive the portions 13a and 14a of the refrigerant pipe 13 and 14. As a result, it is possible to attach the connecting flange 19 so as not to fall off without necessarily brazing the refrigerant pipe 13 and 14.

Furthermore, because the ends of the fitting holes 23 and 24 include the areas with maximum diameter 23c and 24c, even if the edges of the enlarged diameter ends 13b and 14b of refrigerant pipe 13 and 14 have their diameter further enlarged in a tapered form to simplify insertion of refrigerant pipe 15 and 16, it is possible to insert flared ends 13c and 14c inside the maximum diameter sections 12c and 24c. It is thus possible to maintain surface contact between connecting flange 19 and connecting flange 20.

The hexagonal bolt 35 is screwed directly to dividing flange 21 or dividing flange 22 by means of a self-tapping screw, so that the nut 36 can be eliminated. The hexagonal bolt 35 can also be screwed to the nut 36 created on connecting flange 20 via connecting flange 19.

Figure 8:
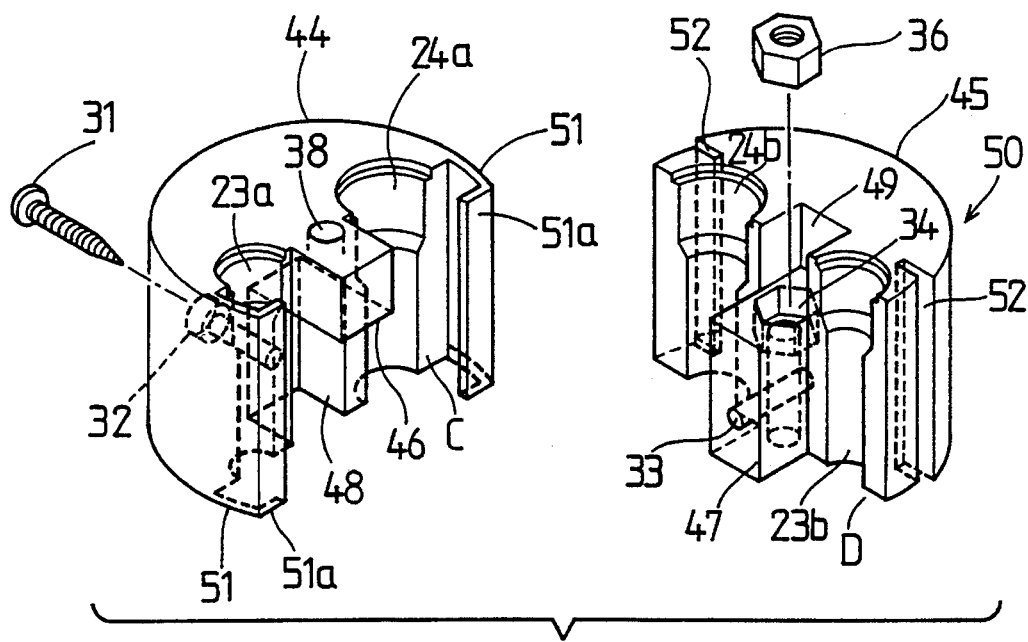
FIG. 8 is a perspective view of dividing flanges showing embodiment 2 of the invention.

FIG. 8 and FIG. 9 show a second embodiment of this invention. With this embodiment, the center area of the dividing surfaces C and D of the dividing flanges 44 and 45 includes alternately the protrusions 46 and 47. Also included on the non-contacting face of dividing flange 44 and the contacting face of dividing flange 45 are the depressions 48 and 49 for fitting of the protrusions 46 and 47. The insertion hole 34 for insertion of the hexagonal nut 36 is formed from the protrusion 47 to the bottom of the depression 49. When joining the two dividing flanges 46 and 47 to form the connecting flange 50, the insertion hole 34 is covered by the protrusion 46 of one dividing flange 44. The hexagonal nut 36 is sandwiched between the protrusion 46 of dividing flange 44 and the protrusion 47 of dividing flange 45 in an axial direction.

Moreover, both sides of the dividing surface C of one dividing flange 44 include hook-shaped retainers 51. On the other dividing flange 45 is a groove 52 for insertion of the joining plate 51a of the retainer 51. The through-hole 32 of the self-tapping screw 31 is formed on one dividing flange 44, and the prepared hole 33 for screwing the self-tapping screw 31 is formed in the protrusion 47 of the other dividing flange 45.

With a device of this structure, in addition to joining with the self-tapping screw 31, the dividing flanges 44 and 45 can also be joined by insertion of the joining plate 51a of the retainer 51 in the groove 52. Even with a structure of this type, it is possible to obtain the same effect as in embodiment 1.

FIG. 10 and FIG. 11 show embodiment 3 of this invention. With this embodiment, there is a hole 54 in one dividing flange 53 extending from the center of the dividing surface E to the peripheral surface of the opposite side. Included on dividing surface B of the other dividing flange 55 is a protrusion 56 for insertion in the hole 54. The insertion hole 34 for insertion of the hexagonal nut 36 is formed on protrusion 56. When creating connecting flange 57 by joining the dividing flanges 53 and 55, the insertion hole 34 is covered by one dividing flange 53. As a result, the hexagonal nut 36 is sandwiched between the dividing flange 53 and protrusion 56 of dividing flange 55 in an axial direction.

The through-hole 32 of the self-tapping screw 31 is formed so that it passes to the other dividing flange 55 from the external peripheral surface to the dividing surface F. The lower hole 33 for screwing of the self-tapping screw 31 is formed in the dividing surface F of one dividing flange 53. In this embodiment, joining of the dividing flanges 53 and 55 is accomplished out only with self-tapping screw 31. In a case featuring such a structure, even if the dividing flanges 53 and 54 are not slid in an axial direction, it is possible to join them by means of movement by which they approach each other in a radial direction. As a result, this is beneficial in cases where there is no leeway in the length of refrigerant pipe 13 and 14 and it is difficult to slide dividing flanges 53 and 55 in an axial direction.

Figure 12:
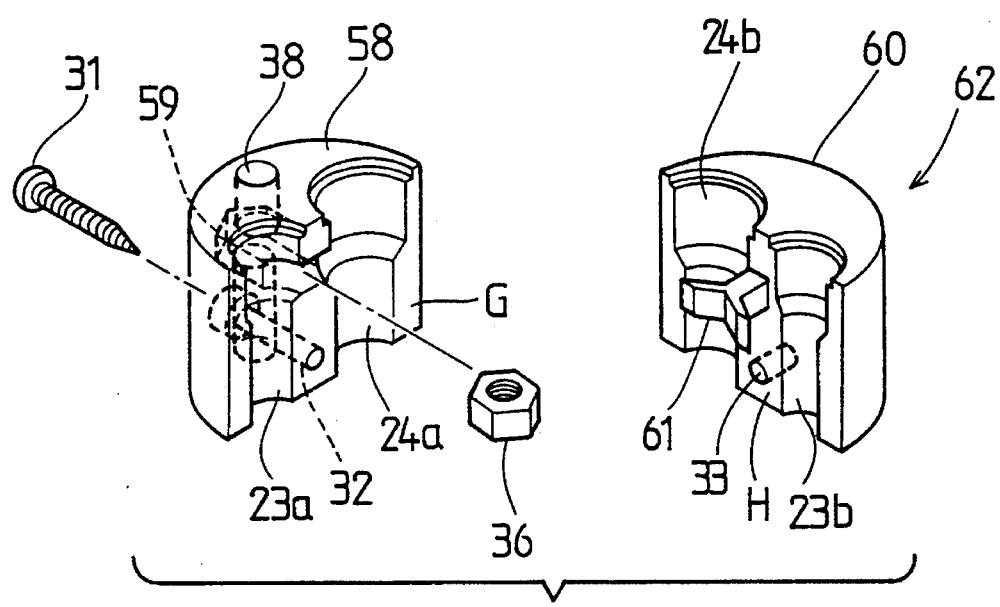
FIG. 12 is a perspective view of dividing flanges showing embodiment 4 of the invention.
Figure 13:
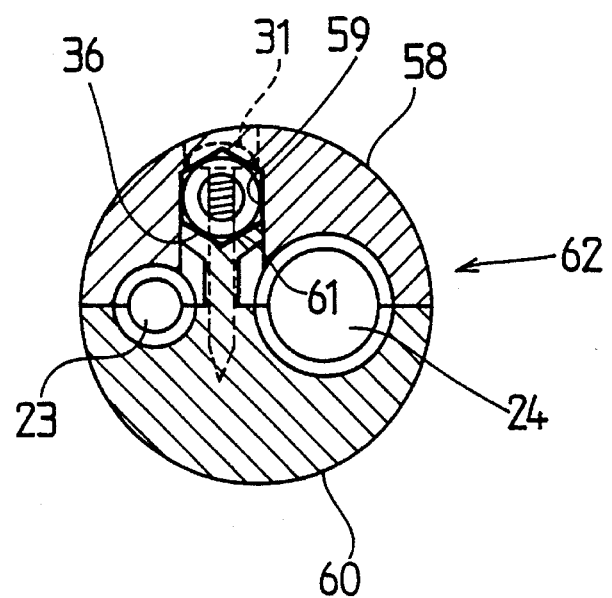
FIG. 13 is a cross-sectional view of combined dividing flanges.
Figure 14:
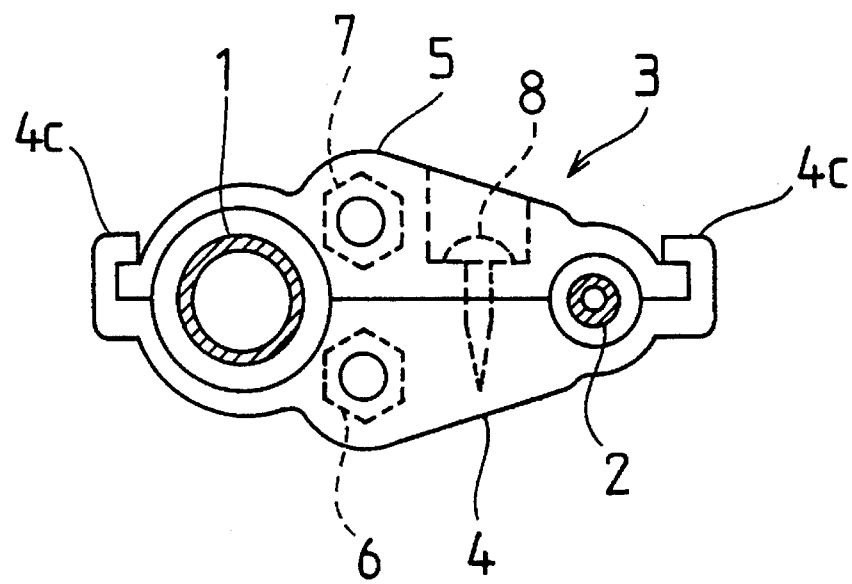
FIG. 14 is a plane drawing showing a conventional connecting flange.
Figure 15:
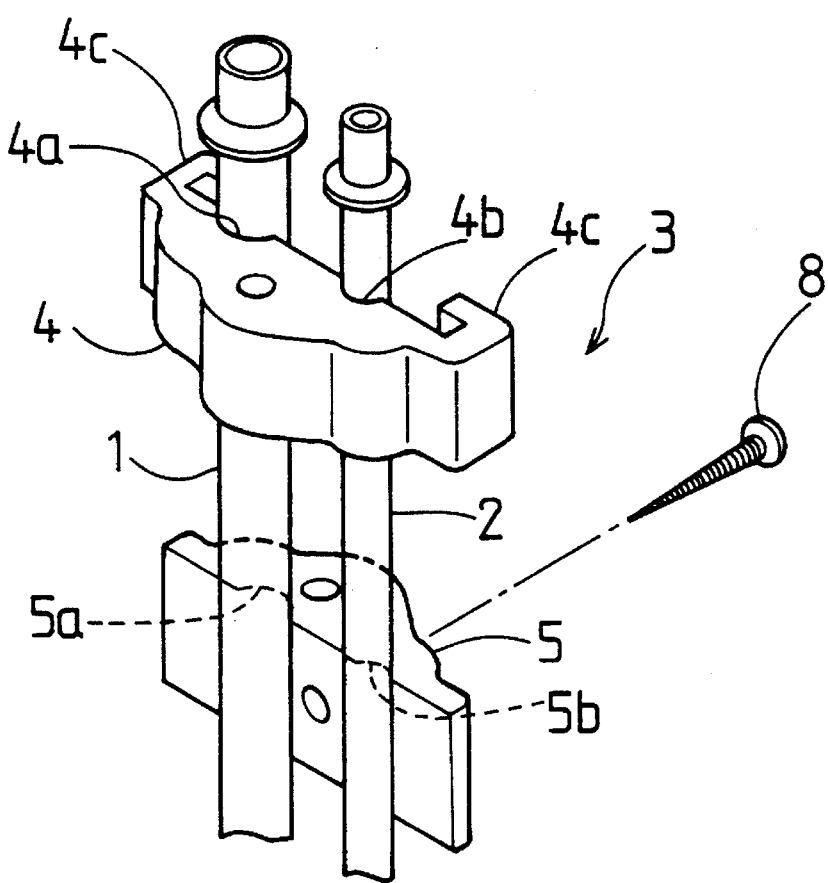
FIG. 15 is an exploded view of a conventional connecting flange.

FIG. 12 and FIG. 13 show embodiment 4 of this invention. With this embodiment, a hole 59 is included on one dividing flange 58 extending from the center of the dividing surface G to the external peripheral surface on the opposite side. The hole 59 is an insertion hole for insertion of the hexagonal nut 36. Moreover, the interior of the hole 59 has a triangular shape to fit with two surfaces of the hexagonal nut 36. Included on the dividing surface B of the other dividing flange 60 is a protrusion 61. When joining the dividing flanges 58 and 60 to create the connecting flange 62, the protrusion 61 is inserted in the hole 59 and the hexagonal nut 36 is pressed down to prevent it from falling out. The edge of the protrusion 61 has a forked shape to press down on two surfaces of the hexagonal nut 36, thus acting together with the triangular recess of the hole 59 to prevent the hexagonal nut 36 from turning.

As was the case in embodiment 3 above, the through hole 32 of the self-tapping screw 31 is formed in one dividing flange 58 so that it passes from the external peripheral surface to the dividing surface G. The lower hole 33 for screwing of the self-tapping screw 31 is formed on the dividing surface H of the other dividing flange 60. In this embodiment as well, joining of the dividing flanges 53 and 55 is achieved simply with the self-tapping screw 31. Even with this structure it is possible to obtain the same results as in embodiment 3 above.

Moreover, this invention is not limited to the embodiments explained in the above text and in the figures. For example, it can also be constructed by joining dividing flanges which have undergone triple division or further division. Moreover, use of this invention is not limited to the pipe connecting device in auto refrigeration cycle. It can also be applied in a wide range of fields for connection of pipe. Effect of the invention:

As was explained above, with this invention, it is possible to obtain the following effects: With the means described in claim 1, it is possible to connect a connecting flange composed of multiple dividing flanges to the side for connection by means of a single connecting means, thus reducing the number of parts required for connection and improving operational efficiency in connecting operations.

With the means described in claim 2, the multiple dividing flanges are connected by a connecting means so that a single dividing flange is connected to the side for connection with a single connecting means, thus making it possible to connect the entire connecting flange to the side for connection.

With the means described in claim 3, because the dividing flange is a non-conductive resin mold, it prevents electric corrosion of pipe and makes it possible to easily produce the device to the required shape, even with complex shapes.

With the means described in claim 4, because a nut insertion hole is included on one of the dividing flanges, it is possible to attach the nut to the connecting flange even without insert molding.

With the means described in claim 5, because the nut insertion hole is covered by the other dividing flange, the nut cannot be lost inadvertently.

With the means described in claim 6, because it features a stepped section in which the dividing surfaces of multiple dividing flanges mutually intermesh, air is prevented from coming between the dividing surfaces.

With the means described in claim 7, there are concave grooves to create fitting holes on the dividing surfaces of the multiple dividing flanges. The result is a connecting flange in which there is mutual connection of dividing flanges while attaching the connecting flange to the pipe.

With the means described in claim 8, because the pipe is female pipe where the end has an enlarged diameter, there is no danger of biting the sealing attached to the pipe on the male side.

With the means described in claim 9, the end of the pipe with enlarged diameter is fitted into a stepped fitting hole created on the connecting flange to prevent falling off, thus eliminating the need for brazing the pipe, etc.

With the means described in claim 10, the edge of one end of the fitting hole is formed with a yet larger diameter, so that, even if the end of the pipe with enlarged diameter is further enlarged, the pipe will not protrude from the connecting flange.

What is claimed is:

1. A pipe connecting device comprising:

a first pipe and second pipe that a fluid flows therein and have engaged portions respectively protruding at respective outer periphery of their one ends thereof in a direction approximately perpendicular to a direction which said fluid flows in;

a third pipe and fourth pipe connected to said one end of said first and second pipes;

a fix plate having an engaging portion which engages simultaneously with said engaged portions of said first and second pipe;

a connecting flange having a plurality of dividing flanges, said plurality of dividing flanges holding said third and fourth pipes on divided surfaces thereof;

a screw means for tightening said fix plate and said connecting flange;

a nut means for receiving said screw means;

a holding portion formed with an insert hole which has a rotation shape for one of said screw means and nut means at one of said divided surfaces of one of said plurality of dividing flanges; and a receiving portion engaging with said holding portion to cover said insert hole at the other one of said divided surfaces of one of said plurality of dividing flanges.

2. A pipe connecting device according to claim 1, wherein said plurality of dividing flanges are made of nonconductive resin material.

3. A pipe connecting device according to claim 2, wherein one of said plurality of dividing flanges has a fitting portion preventing said dividing flanges from moving in a direction approximately perpendicular to said divided surfaces when dividing flanges are combined and the other of said plurality of dividing flanges has a fitted portion which engages with said fitting portion.

4. A pipe connecting device according to claim 2, wherein said connecting flange and said fix plate are tightened by one screw and nut.

5. A pipe connecting device according to claim 2, wherein said first and third pipes are refrigerant passages at a refrigerant inlet side of an evaporator of refrigerant cycle of an automotive air conditioner, said third and fourth pipes are refrigerant passages at a refrigerant outlet side of said evaporator, at least one of said connecting flange and said fix plate is disposed at a through-hole of a partition separating between an engine room and a passenger room.

6. A pipe connecting device according to claim 2, wherein said dividing flanges are combined by one connecting means.

7. A pipe connecting device according to claim 5, wherein said plurality of dividing flanges have stepped portions which engages with an outer periphery of corresponding pipe at said divided surfaces.

8. A pipe connecting device according to claim 4, wherein said third and fourth pipes have enlarged diameter portions forming enlarged diameter therein respectively at one ends, said enlarged diameter portions are female pipes to insert said first and second pipes into and said enlarged diameter portions are fixed to said connecting flange.

9. A pipe connecting device according to claim 8, wherein said connecting flange has a plurality of through-holes which have a first diameter larger than a outer diameter of said enlarged diameter portion at a side of said first and second pipes and a second diameter smaller than said outer diameter of said enlarged diameter portion at opposite side thereof so that a stepped portion is formed in said through-hole.

10. A pipe connecting device according to claim 9, wherein said through-holes further have a third diameter larger than said first diameter at edges of said through-hole at a side of said first and second pipes.

11. A pipe connecting device comprising:

a first pipe and second pipe that a fluid flows therein and have engaged portions respectively protruding at respective outer periphery of their one ends thereof in a direction approximately perpendicular to a direction which said fluid flows in;

a third pipe and fourth pipe connected to said one end of said first and second pipes;

a fix plate having an engaging portion which engages simultaneously with said engaged portions of said first and second pipe;

a connecting flange having a plurality of dividing flanges, said plurality of dividing flanges holding said third and fourth pipes on divided surfaces thereof;

a screw means for tightening said fix plate and said connecting flange;

a nut means for receiving said screw means;

a first protrusion portion protruding from one of said divided surfaces to opposite divided surface and disposed on one of said dividing flanges, said first protrusion portion having an insert hole which one of said screw means and nut means is inserted and which has a rotation whirl-stop shape to prevent said one of said screw means and nut means from moving at one of said divided surfaces of one of said plurality of dividing flanges;

a second protrusion portion protruding from one of said divided surfaces to opposite divided surface and disposed on one of said dividing flanges, said second protrusion portion covering said insert hole to hold said one of said screw means and nut means in said insert hole; and a receiving portion engaging with said holding portion to cover said insert hole at the other one of said divided surfaces of one of said plurality of dividing flanges.

12. A pipe connecting device according to claim 11, wherein said plurality of dividing flanges are made of non-conductive resin material.

13. A pipe connecting device according to claim 12, wherein one of said plurality of dividing flanges has a fitting portion preventing said dividing flanges from moving in a direction approximately perpendicular to said divided surfaces when dividing flanges are combined and the other of said plurality of dividing flanges has a fitted portion which engages with said fitting portion.

14. A pipe connecting device according to claim 12, wherein said connecting flange and said fix plate are tightened by one screw and nut.

15. A pipe connecting device according to claim 12, wherein said first and third pipes are refrigerant passages at a refrigerant inlet side of an evaporator of refrigerant cycle of an automotive air conditioner, said third and fourth pipes are refrigerant passages at a refrigerant outlet side of said evaporator, at least one of said connecting flange and said fix plate is disposed at a through-hole of a partition separating between an engine room and a passenger room.

16. A pipe connecting device according to claim 12, wherein said dividing flanges are combined by one connecting means.

17. A pipe connecting device according to claim 14, wherein said third and fourth pipes have enlarged diameter portions forming enlarged diameter therein respectively at one ends, said enlarged diameter portions are female pipes to insert said first and second pipes into and said enlarged diameter portions are fixed to said connecting flange.

18. A pipe connecting device according to claim 15, wherein said plurality of dividing flanges have stepped portions which engages with an outer periphery of corresponding pipe at said divided surfaces.

19. A pipe connecting device according to claim 17, wherein said connecting flange has a plurality of through-holes which have a first diameter larger than a outer diameter of said enlarged diameter portion at a side of said first and second pipes and a second diameter smaller than said outer diameter of said enlarged diameter portion at opposite side thereof so that a stepped portion is formed in said through-hole.

20. A pipe connecting device according to claim 19, wherein said through-holes further have a third diameter larger than said first diameter at edges of said through-hole at a side of said first and second pipes.

* * * * *